United States Patent [19]

Hara et al.

[11] 4,429,733

[45] Feb. 7, 1984

[54] APPARATUS FOR CONTROLLING BLOWING MODE OF A CAR AIR-CONDITIONER

[75] Inventors: Toshizo Hara, Kawashima; Shinji Sutoh, Annaka; Toshio Kojima, Kounan, all of Japan

[73] Assignee: Diesel Kiki Co., Ltd., Tokyo, Japan

[21] Appl. No.: 248,834

[22] Filed: Mar. 30, 1981

[30] Foreign Application Priority Data

Mar. 31, 1980 [JP] Japan ................................ 55-40231

[51] Int. Cl.³ ........................... B60H 1/00; F24F 7/00
[52] U.S. Cl. ..................................... 165/16; 165/25; 165/43; 98/2.01; 236/49
[58] Field of Search ...................... 165/16, 23, 25, 26, 165/28, 30, 41, 42, 43; 98/2.01; 236/49, 13, 91 D, 91 C, 91 R

[56] References Cited

U.S. PATENT DOCUMENTS

| | | | |
|---|---|---|---|
| 3,934,642 | 1/1976 | Coulson et al. | 165/23 |
| 4,183,397 | 1/1980 | Poirier d'Ange d'Orsay et al. | 165/43 |
| 4,262,738 | 4/1981 | Kato et al. | 165/25 |
| 4,289,195 | 9/1981 | Bellot et al. | 165/28 |
| 4,323,111 | 4/1982 | Iijima | 165/25 |
| 4,337,821 | 7/1982 | Saito | 165/42 |

Primary Examiner—Edward G. Favors
Assistant Examiner—Harry Tanner
Attorney, Agent, or Firm—Guy W. Shoup; Gerard F. Dunne

[57] ABSTRACT

In an apparatus for controlling blowing mode of a car air-conditioner, a position of a shutter for changing the blowing mode is continuously changed in accordance with a control signal which depends upon at least the air temperature outside car. The control signal is applied to the actuator to position the shutter at an appropriate position in response to the ambient conditions.

9 Claims, 5 Drawing Figures

APPARATUS FOR CONTROLLING BLOWING MODE OF A CAR AIR-CONDITIONER

The present invention relates to an apparatus for automatically controlling the blowing mode of a car air-conditioner, and more particularly, to an apparatus for automatically and steplessly changing the blowing mode of the car air-conditioner, in relation to the temperature outside the car.

In the prior art car air-conditioner, a shutter for controlling the air flow path in the duct of the air-conditioner is set at certain fixed blowing mode positions to change the direction of the air issuing from the outlet vent of the air-conditioner. That is, the blowing mode is switched over by controlling the position of a shutter located at the outlet vent of the air-conditioner. For example, when the air-conditioner is operated in the heater mode, the shutter position is set in a predetermined heater mode position for directing the air from the air-conditioner downward. On the other hand, when the air-conditioner is operated in the cooler mode, the shutter is positioned in a predetermined cooler mode position to direct the cool air upward. In some cases, the shutter is positioned in such a way that the air from the air-conditioner is directed both upward and downward. At any rate, since the shutter is set at predetermined positions in accordance with the operating mode of the air-conditioner, it is not possible to set the shutter at precisely the position which is best under any given set of conditions. Because of this, the air conditioner often fails to provide optimum comfort.

It is, therefore, an object of the present invention to provide an improved apparatus for continuously controlling the blowing mode of an air-conditioner for a vehicle.

It is another object of the present invention to provide an apparatus for controlling the blowing mode of the air from an air-conditioner in accordance with the ambient conditions.

It is a further object of the present invention to provide an apparatus for controlling the blowing mode of an air-conditioner in which the blowing mode control characteristics depend upon the operation mode of the air-conditioner.

According to the present invention, an improved apparatus for controlling the blowing mode of an air-conditioner having a shutter for changing the flow path of the air from the air-conditioner, comprises a signal generator for generating a control signal which changes in level in accordance with at least the air temperature outside the car and an actuator for controlling the position of the shutter. The control signal is applied to the actuator to position the shutter at an appropriate position in accordance with the ambient conditions. The actuator may also be controlled so as to provide different shutter positioning ranges depending on the operating mode of the air conditioner. As a result, continuous and automatic change in blowing mode can be attained to maintain the car interior constantly in a comfortable condition.

Further objects and advantages of the present invention will be apparent from the following detailed description to be read in conjunction with the accompanying drawings in which.

Figure 1:
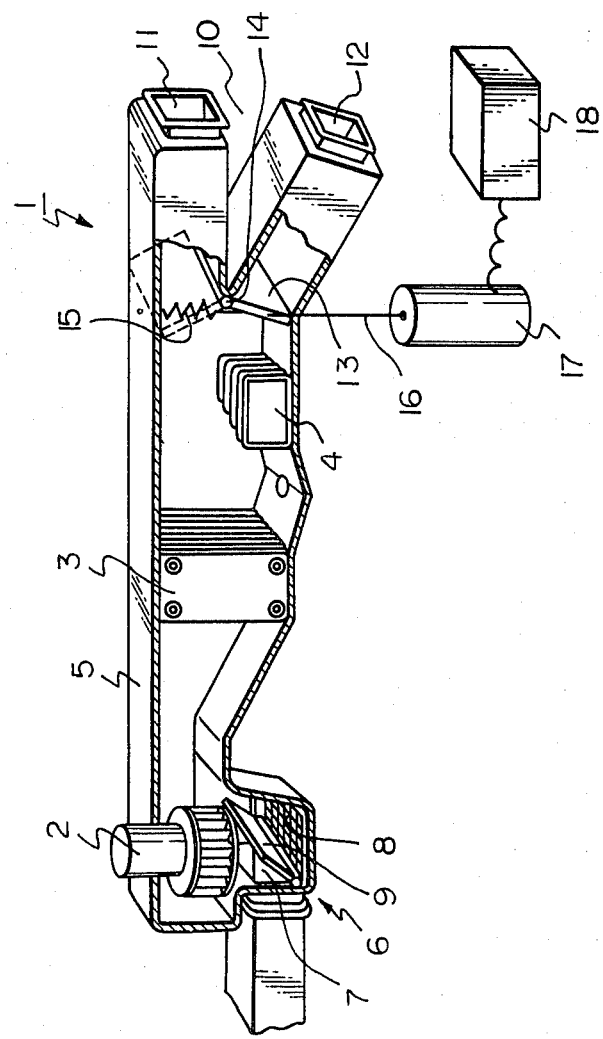
FIG. 1 illustrates a partially cutaway view in perspective of an embodiment of the present invention.

Referring to FIG. 1, there is shown an air-conditioner 1 for use in a vehicle, for example a passenger car, which has its blowing mode controlled by the blowing mode controlling device of the present invention. The air-conditioner 1 comprises a blower 2, an evaporator 3 and a heater core 4 arranged as illustrated in FIG. 1. An intake vent 6 of a duct 5 has an opening 7 communicating with the outside of the car and an opening 8 communicating with the inside of the car. A shutter 9 is provided at the intake vent 6 to selectively close either of the openings 7 and 8. By operating the shutter 9, air in the car or air from outside the car is selectively introduced into the duct 5 by the blower 2. In this connection, it is to be noted that the shutter 9 may be positioned at the position shown in FIG. 1 to take in a mixture of the air in the car and the air outside the car into the duct 5. At the outlet side 10 of the air-conditioner 1, there is provided an upper vent 11 for feeding the air from the air-conditioner into the car at a higher level and a lower vent 12 for feeding the air at a lower level. For adjusting the air quantity from each of vents 11 and 12, a shutter 13 for changing the blowing mode is provided at the branching-off point of the duct 5 so as to be rotatable about a shaft 14. The shutter 13 is upwardly biased by a spring 15 and has one end of an operating rod 16 of a solenoid actuator 17 pivotally connected thereto. The solenoid actuator 17 is controlled by a control unit 18 to position the shutter 13. By energizing the actuator 17 under the control of the control unit 18, the blowing mode of the air-conditioner can be adjusted in a smooth and continuous manner, instead of discrete steps. The role of the shutter 13 in the air-conditioner 1 is to distribute the air passing through the evaporator 3 and the heater core 4 into the upper vent 11 and/or the lower vent 12 at the required ratio decided by the control unit 18. It will be easily understood that the conventional shutter positions for heater mode, cooler mode or bi-level mode can also be had by adjusting the energizing condition of the solenoid actuator 17.

Figure 2:
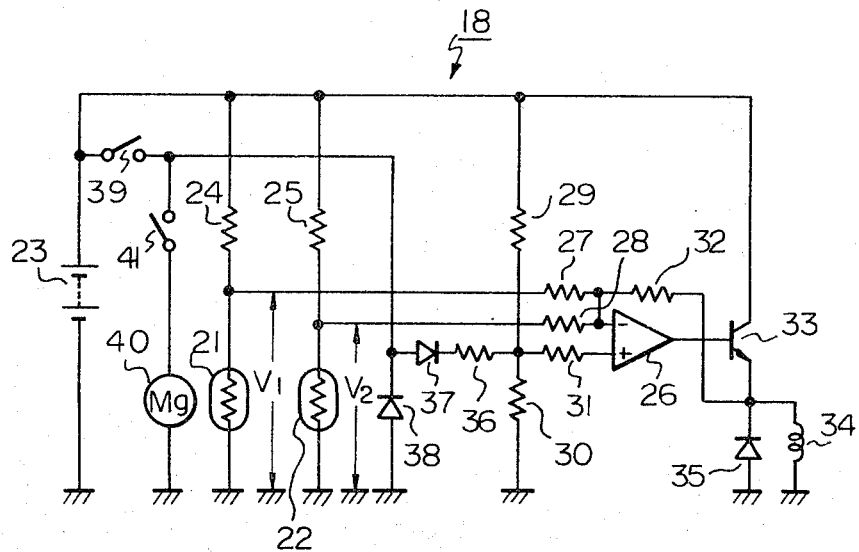
FIG. 2 is a circuit diagram of the control unit shown in FIG. 1.

FIG. 2 illustrates the circuit diagram of the control unit 18. The control unit 18 includes a thermistor 21 for measuring the outside air temperature $T_1$ and a thermistor 22 mounted, for example, on the dashboard of the car for measuring the intensity of the sunlight. The thermistors 21 and 22 are coupled to a battery 23 through resistors 24 and 25, respectively. Thus, voltage signals $V_1$ and $V_2$ indicative of the outside air temperature $T_1$ and the temperature $T_2$ at a place in the car frequently exposed to sunlight appear across the thermistors 21 and 22. These voltage signals $V_1$ and $V_2$ are applied to the inverting input terminal of an operational amplifier 26 through input resistors 27 and 28, respectively. To the non-inverting input terminal of the operational amplifier 26 is applied a constant voltage determined by the resistance values of resistors 29 and 30 through an input resistor 31. A feedback resistor 32 is connected between the emitter of a transistor 33, whose base is connected to the output terminal of the operational amplifier 26, and the inverting input terminal of the operational amplifier 26. The collector of the transistor 33 is connected to the positive terminal of the battery 23. To the emitter circuit of the transistor 33 is connected a parallel circuit consisting of the exciting coil 34 of the solenoid actuator 17 and a diode 35 for preventing the coil 34 from producing a counter electromotive force. Therefore, the amount of emitter current $I_1$ of the transistor 33 is varied in proportion to $T_1+T_2$, and as the value of the current $I_1$ increases, the shutter 13 is rotated counterclockwise as viewed in FIG. 1. More specifically, when the value $T_1+T_2$ is small, the upper vent 11 is closed by the shutter 13, and as the value $T_1+T_2$ becomes larger, the shutter 13 is rotated smoothly without discrete steps in a counterclockwise manner towards a position for a ventilation mode in which the lower vent 12 is closed. In the intermediate positions the ventilation mode is bi-level.

Figure 3:
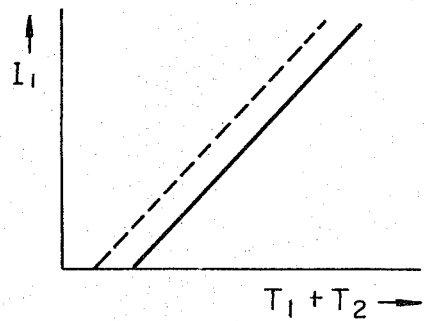
FIG. 3 is a graph illustrating the driving characteristics of the actuator in FIG. 1.

In the air-conditioner 1, to fix separate ranges of positional change for the shutter 13 in cooler mode operation and heater mode operation of the air-conditioner 1, a series circuit consisting of a resistor 36 and diodes 37 and 38 is connected in parallel with the resistor 30, and the junction point between the diodes 37 and 38 is connected to the positive terminal of the battery 23 through a switch 39 which is closed when cooler operation is selected. The junction point between the diodes 37 and 38 is further connected to ground through a series circuit consisting of a magnetic clutch 40 for actuating or de-actuating a compressor for a cooling device including the evaporator 3 and a thermosensitive switch 41 responsive to the temperature of the air cooled by the air-conditioner. Therefore, when the switch 39 is opened, that is, when the heater core 4 is operated, the diodes 37 and 38 are biased in the reverse direction and the constant voltage determined by the resistors 29 and 30 is applied to the non-inverting input terminal of the operational amplifier 26. In this case, the relationship between the value $T_1+T_2$ and the current $I_1$ flowing through the coil 34 is as illustrated by the full line in FIG. 3. On the other hand, when the switch 39 is closed in cooler mode operation, the diode 37 is biased in the forward direction and the voltage level at the non-inverting input terminal of the operational amplifier 26 becomes higher than said fixed voltage, so that the relationship between the value $T_1+T_2$ and the current $I_1$ is as shown by the dotted line in FIG. 3. Thus, separate positioning control characteristics are provided for the shutter 13 for the cooler and heater modes of operation.

Although this embodiment is arranged so that the value of the current $I_1$ is proportional to the value $T_1+T_2$, it is, alternatively, possible to make the value of the current $I_1$ proportional to $T_1+\alpha T_2$ (where $\alpha$ is a constant determined by the resistance values of the resistors 27 and 28) by suitably selecting the resistance values of the resistors 21 and 22. In this way, greater weight can be selectively given to the outside air temperature or the temperature at the place frequently exposed to sunlight.

Figure 4:
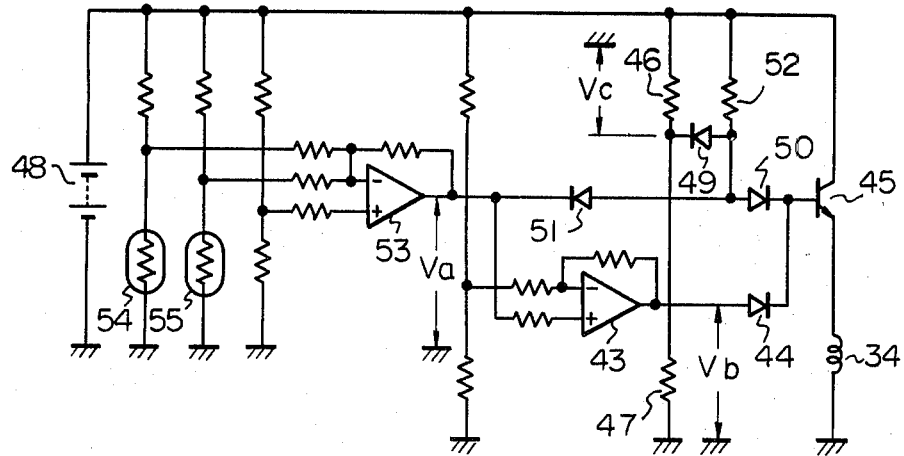
FIG. 4 is a circuit diagram of another embodiment of the control unit of FIG. 1.
Figure 5:
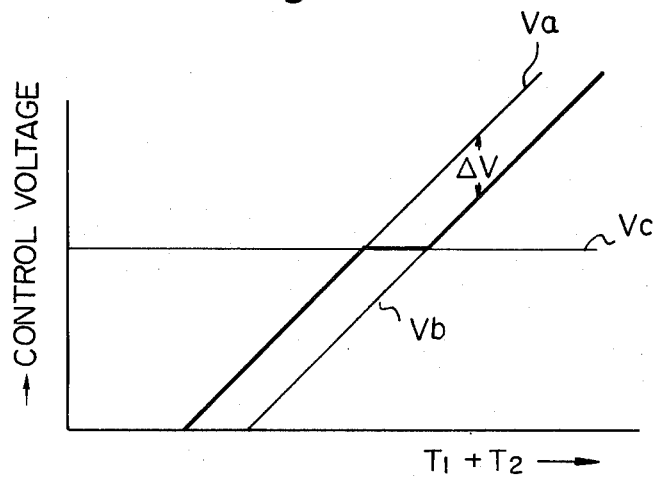
FIG. 5 is a graph illustrating the control voltage characteristics of the circuit shown in FIG. 4.

FIG. 4 illustrates a circuit diagram of another embodiment of the present invention. In the circuit illustrated in FIG. 4, an operational amplifier 53 is coupled to a thermistor 54 for measuring the outside air temperature $T_1$ and a thermistor 55 for measuring the temperature $T_2$ at a place in the car frequently exposed to sunlight. A first output voltage $V_a$ varied in level in proportion to $T_1+T_2$ is output from the operational amplifier 53. This circuit arrangement is similar to that of the signal generator comprised mainly of the operational amplifier 26 in FIG. 3. Therefore, the relationship between the first output voltage $V_a$ and the temperature $T_1+T_2$ is as shown in FIG. 5. The first output voltage $V_a$ is applied to the non-inverting input terminal of an operational amplifier 43 which is adapted to receive a constant voltage at its inverting input terminal. As a result, a second output voltage $V_b$ which is offset by $\Delta V$ relative to the first output voltage is obtained. The voltage $V_b$ is applied, through a diode 44, to a transistor 45 whose emitter circuit is connected to the exciting coil 34 of the solenoid actuator 17 shown in FIG. 1. A constant voltage $V_c$ obtained by dividing the voltage of a battery 48 by resistors 46 and 47 is applied to the base of the transistor 45 through diodes 49 and 50. The first output voltage $V_a$ is further applied to the junction point between the diodes 49 and 50 through a diode 51. This junction point is connected to the positive terminal of the battery 48 through a resistor 52.

According to this circuit arrangement, the voltage $V_a$ is always higher than the voltage $V_b$. When the voltage $V_a$ is lower than the voltage $V_c$, the diodes 50 and 51 are biased in the forward direction and the diodes 44 and 49 are reverse-biased. Therefore, the base voltage of the transistor 45 is determined by the voltage $V_a$ within the range of $V_c > V_a$. When the voltage $V_c$ becomes lower than the voltage $V_a$, the diodes 51 and 44 are reverse-biased and the diodes 49 and 50 are forward-biased. As a result, the base voltage of the transistor 45 becomes a fixed voltage determined by the voltage $V_c$. This condition lasts until the voltage $V_b$ becomes higher than the voltage $V_c$. When the voltage $V_b$ becomes higher than the voltage $V_c$, the diode 44 becomes forward-biased and the base voltage of the transistor 45 is varied depending upon the voltage $V_b$.

FIG. 5 shows the relationship between the voltages $V_a$, $V_b$ and $V_c$ and the value $T_1+T_2$. In FIG. 5, the thick lines designate the voltage applied to the base of the transistor 45 as can be understood from the foregoing description. Forward voltage drops of the diodes 44, 49, 50 and 51 are neglected in FIG. 5.

According to this arrangement, a current flowing through the exciting coil 34 can be varied linearly according to changes in $T_1+T_2$ so that the blowing mode can be continuously and automatically set. Furthermore, the mode switching characteristics can be automatically changed when the value $T_1+T_2$ becomes large (when it is hot) or when the value becomes small (when it is cold). In addition, when the value $T_1+T_2$ is within an intermediate range, the exciting coil 34 is so controlled that no change in the blowing mode is effected by a change in the temperature $T_1+T_2$. Therefore, when the temperature in the car is within a desired, comfortable range and substantially equal air flows are provided through the upper and lower air vents, the mode is fixed mode change is not effected and the comfortable condition in the car can be maintained.

Although the foregoing embodiments are so arranged that mode change is effected according to the outside air temperature and the temperature at a place in the car frequently exposed to sunlight, the mode change can alternatively be effected on the basis of the outside air temperature alone.

Moreover, although the solenoid actuator 17 is employed as a driving device for the shutter 13 in this embodiment, in this present invention, the device for driving the shutter 13 is not only limited to the solenoid actuator, but any conventional device for driving the shutter, such as an electric motor, can also be employed.

According to the present invention, as described above, the mode changeover can be effected serially and automatically according to external conditions and there can be provided an automatic mode changeover apparatus for a car-air conditioner that gives satisfactory effect in use.

We claim:

1. An apparatus for controlling the blowing mode of air from a car air-conditioner for vehicles, said air-conditioner having a duct in which a blower, an evaporator and a heater core are mounted, comprising:

means for changing the blowing mode of the air from the air-conditioner, said changing means having an upper vent and a lower vent which are formed at the outlet portion of said duct and a shutter for changing the ratio of the quantity of air issuing from said upper vent to the quantity of air issuing from said lower vent;

means for generating a control signal depending upon at least the temperature of the air outside of the vehicle, said generating means including a sensor for producing an output signal indicative of the temperature of the air outside of the vehicle, and a circuit for shifting the level of the output signal in response to the operating mode of the air-conditioner; and means responsive to the control signal for driving said shutter so as to be positioned at any desired position in a continuous positional manner while avoiding discrete steps in the change of position.

2. An apparatus as claimed in claim 1 wherein said sensor produces a first signal indicative of the temperature of the air outside of the vehicle, and said generating means includes a second sensor for producing a second signal indicative of the intensity of the sunlight, and a circuit for generating said control signal on the basis of the first and second signals, said control signal being changed in level in response to at least the first signal and the second signal.

3. An apparatus as claimed in claim 1 wherein said sensor produces a first signal indicative of the temperature of the air outside of the vehicle, and said generating means includes a second sensor for producing a second signal indicative of the intensity of the sunlight, a switch responsive to the switching of the operation mode of the air-conditioner, a circuit for generating said control signal on the basis of the first and second signals, and a level shifter for shifting the level of said control signal in response to the operation of the switch.

4. An apparatus as claimed in claim 2 wherein the level of said control signal is changed in proportion to the magnitude of the summation of the values of the first and the second signals and said driving means actuates said shutter in such a way that the quantity of air issuing from said upper vent is increased as the level of said control signal becomes larger.

5. An apparatus for conditioning the air in a vehicle, including a duct branching into an upper vent adapted to exit conditioned air in an upper portion of the vehicle and a lower vent adapted to exit conditioned air in a lower portion of the vehicle, means including a shutter positioned between the area of branching of said upper vent and said lower vent for adjusting the ratio of air exiting from said respective vents, means for generating a control signal corresponding to at least the sensed temperature of the air outside of the vehicle, and control means responsive to said control signal for moving said shutter to any position within its range of movement corresponding to said control signal for directing more of the air towards said upper vent as the sensed temperature increases, said generating means including a sensor for producing an output signal indicative of the temperature sensed for the air outside of the vehicle, and a circuit for shifting the level of the output signal in response to the operation of the device to cool air within the vehicle.

6. An apparatus as claimed in claim 5, said sensor producing a first signal indicative of the temperature sensed for the air outside of the vehicle, and said generating means including a second sensor for producing a second signal indicative of the intensity of sunlight within the vehicle, and a circuit means for generating said control signal on the basis of the first and second signals, said control signal being changed in level in response to at least the first and second signal.

7. An apparatus as claimed in claim 5, said sensor producing a first signal indicative of the temperature sensed for the air outside the vehicle, and said generating means including a second sensor for producing a second signal indicative of the intensity of the sunlight within the vehicle, a switch for changing the mode of operation of the apparatus to primarily cool the air within the vehicle, a circuit for generating said control signal on the basis of the first and second signals, and a shifting means for shifting the level of said control signal in response to the operation of said switch.

8. An apparatus as claimed in claim 1, said circuit being activated by activation of a switch.

9. An apparatus as claimed in claim 5, said circuit being activated by activation of a switch.

* * * * *